United States Patent
Kang

(10) Patent No.: US 12,275,438 B2
(45) Date of Patent: Apr. 15, 2025

(54) APPARATUS AND METHOD FOR CONTROLLING DRIVING OF A VEHICLE

(71) Applicants: HYUNDAI MOTOR COMPANY, Seoul (KR); KIA CORPORATION, Seoul (KR)

(72) Inventor: Dong Hoon Kang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 329 days.

(21) Appl. No.: 17/721,579

(22) Filed: Apr. 15, 2022

(65) Prior Publication Data
US 2023/0028342 A1    Jan. 26, 2023

(30) Foreign Application Priority Data
Jul. 26, 2021    (KR) .................. 10-2021-0098048

(51) Int. Cl.
*B60W 60/00*    (2020.01)

(52) U.S. Cl.
CPC ..... *B60W 60/0053* (2020.02); *B60W 2540/10* (2013.01)

(58) Field of Classification Search
CPC ......... B60W 60/0053; B60W 2540/10; B60W 60/0051; B60W 40/08; B60W 50/08; B60W 60/001; B60W 2540/30; B60K 26/021
See application file for complete search history.

(56) References Cited

U.S. PATENT DOCUMENTS

| | | | |
|---|---|---|---|
| 9,580,080 B1 * | 2/2017 | Letwin ................. | G05D 1/0061 |
| 9,582,003 B1 * | 2/2017 | Levandowski ........ | B60K 28/02 |
| 2011/0010034 A1 * | 1/2011 | Zagorski ............... | B60W 50/12 |
| | | | 701/31.4 |
| 2014/0257661 A1 * | 9/2014 | Schulman ............. | B60W 50/08 |
| | | | 701/1 |
| 2017/0327126 A1 * | 11/2017 | Levandowski ....... | B60W 50/10 |
| 2018/0150074 A1 * | 5/2018 | Hashimoto ....... | B60W 60/0053 |
| 2021/0061268 A1 * | 3/2021 | Ike ..................... | B60T 8/17558 |
| 2021/0213942 A1 * | 7/2021 | Kayano ................. | B60W 30/09 |

FOREIGN PATENT DOCUMENTS

| | | | | |
|---|---|---|---|---|
| DE | 102007054397 A1 * | 5/2009 | ............... | B60T 7/22 |
| DE | 102010025797 A1 * | 2/2011 | ........... | B60W 50/10 |
| JP | 2003137001 A * | 5/2003 | | |

(Continued)

*Primary Examiner* — Hung Q Nguyen
(74) *Attorney, Agent, or Firm* — Lempia Summerfield Katz LLC

(57) ABSTRACT

An apparatus for controlling driving of a vehicle including a sensor that detects an input amount of an accelerator pedal applied a user and includes a controller. The controller determines an erroneous actuation of the accelerator pedal based on the input amount of the accelerator pedal and determines whether to release autonomous driving according to whether the accelerator pedal is erroneously pressed or actuated. In technology that controls autonomous driving by remotely generating autonomous driving control values, it is possible to improve the functional safety of a vehicle by determining whether to release the autonomous driving by determining a user's erroneous input or actuation of the accelerator pedal.

18 Claims, 5 Drawing Sheets

(56) References Cited

FOREIGN PATENT DOCUMENTS

| JP | 2013151260 | A | * | 8/2013 | |
|----|------------|----|----|--------|--------|
| JP | 2019194088 | A | * | 11/2019 | |
| KR | 20180050704 | A | * | 5/2018 | |
| RU | 2737180 | C1 | * | 11/2020 | ............ B60Q 9/008 |
| WO | WO-2017102057 | A1 | * | 6/2017 | ............ B60W 30/12 |

\* cited by examiner

APPARATUS AND METHOD FOR CONTROLLING DRIVING OF A VEHICLE

CROSS-REFERENCE TO RELATED APPLICATION

This application claims the benefit of priority to Korean Patent Application No. 10-2021-0098048, filed in the Korean Intellectual Property Office on Jul. 26, 2021, the entire contents of which are incorporated herein by reference.

TECHNICAL FIELD

The present disclosure relates to an apparatus and method for controlling driving of a vehicle.

BACKGROUND

When a user presses an accelerator pedal, an autonomous vehicle determines (i.e., recognizes) the user's intervention to transfer the driving control to the user, and releases the autonomous driving control at the time when the accelerator pedal is pressed.

However, even when the user erroneously actuates or presses the accelerator pedal by mistaking the brake for the accelerator pedal, the autonomous vehicle may determine the user's erroneous input as the user's intervention, and release the autonomous driving control, thereby possibly leading to an accident.

SUMMARY

In view of the foregoing, technology is desirable for determining whether an input from actuation of a user's accelerator pedal is an erroneous input in an autonomous vehicle and controlling autonomous driving. The present disclosure has been made to solve the above-mentioned problems occurring in the prior art while advantages achieved by the prior art are maintained intact.

An aspect of the present disclosure provides an apparatus and method for controlling driving of a vehicle. The apparatus and method are capable of determining whether a user's pressing of an accelerator pedal is an erroneous input and controlling autonomous driving.

The technical problems to be solved by the present inventive concept are not limited to the aforementioned problems. Any other technical problems not mentioned herein should be clearly understood from the following description by those of ordinary skill in the art to which the present disclosure pertains.

According to an aspect of the present disclosure, an apparatus for controlling driving of a vehicle includes a sensor and a controller. The sensor detects an input amount of an accelerator pedal, i.e., the amount or pressure applied or the amount that the accelerator pedal is pressed or depressed by a user. The controller determines an erroneous input of the accelerator pedal based on the input amount of the accelerator pedal and determines whether to release autonomous driving according to whether the accelerator pedal is erroneously pressed.

The controller may release lateral autonomous driving of the vehicle and maintain longitudinal autonomous driving of the vehicle when the controller determines that the input amount of the accelerator pedal exceeds a first input amount.

The controller may determine to maintain the autonomous driving when it is determined that the input amount of the accelerator pedal does not exceed a first input amount.

The controller may determine whether the input amount of the accelerator pedal is greater than or equal to a second input amount greater than the first input amount when it is determined that the input amount of the accelerator pedal exceeds the first input amount.

The controller may determine whether a user monitoring time exceeds a first time when it is determined that the input amount of the accelerator pedal is not equal to or greater than the second input amount.

The controller may deactivate the autonomous driving and transfer driving control right to the user when it is determined that the input amount of the accelerator pedal is not equal to or greater than the second input amount at a time point when the user monitoring time exceeds the first time.

The controller may determine that the accelerator pedal is erroneously input, may release the lateral autonomous driving of the vehicle, and may maintain the longitudinal autonomous driving of the vehicle when it is determined that the input amount of the accelerator pedal is equal to or greater than the second input amount.

The controller may determine whether the input amount of the accelerator pedal exists at a time point when a user monitoring time exceeds a first time when it is determined that the input amount of the accelerator pedal is equal to or greater than the second input amount.

The controller may determine that the erroneous input of the accelerator pedal is maintained, may release the lateral autonomous driving of the vehicle, and may maintain the longitudinal autonomous driving of the vehicle when it is determined that the input amount of the accelerator pedal exists at the time point when the user monitoring time exceeds the first time.

The controller may vary the first time based on driving tendency of the user and based on surrounding information of the vehicle.

According to an aspect of the present disclosure, a method of controlling driving of a vehicle includes detecting an input amount of an accelerator pedal by a user and determining an erroneous input of the accelerator pedal based on the input amount of the accelerator pedal. The method also includes determining whether to release autonomous driving according to whether the accelerator pedal is erroneously input.

The method may further include releasing lateral autonomous driving of the vehicle and maintaining longitudinal autonomous driving of the vehicle when it is determined that the input amount of the accelerator pedal exceeds a first input amount.

The method may further include determining to maintain the autonomous driving when it is determined that the input amount of the accelerator pedal does not exceed a first input amount.

The method may further include determining whether the input amount of the accelerator pedal is greater than or equal to a second input amount greater than the first input amount when it is determined that the input amount of the accelerator pedal exceeds the first input amount.

The method may further include determining whether a user monitoring time exceeds a first time when it is determined that the input amount of the accelerator pedal is not equal to or greater than the second input amount.

The method may further include deactivating the autonomous driving and transferring driving control to the user when it is determined that the input amount of the accelerator pedal is not equal to or greater than the second input amount at a time point when the user monitoring time exceeds the first time.

The method may further include determining that the accelerator pedal is erroneously input, releasing the lateral autonomous driving of the vehicle, and maintaining the longitudinal autonomous driving of the vehicle when it is determined that the input amount of the accelerator pedal is equal to or greater than the second input amount.

The method may further include determining whether the input amount of the accelerator pedal exists at a time point when a user monitoring time exceeds a first time when it is determined that the input amount of the accelerator pedal is equal to or greater than the second input amount.

The method may further include releasing the lateral autonomous driving of the vehicle and maintaining the longitudinal autonomous driving of the vehicle when it is determined that the input amount of the accelerator pedal exists at the time point when the user monitoring time exceeds the first time.

The first time may vary based on driving tendency of the user and based on surrounding information of the vehicle.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
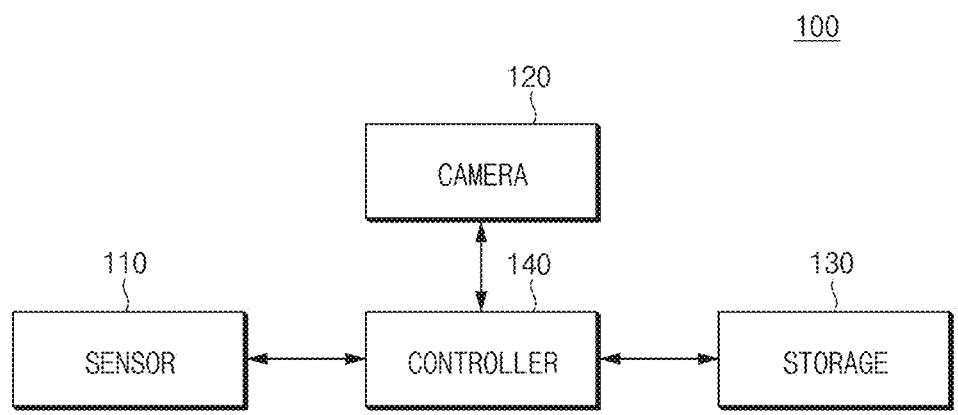
FIG. 1 is a block diagram illustrating the configuration of an apparatus for controlling driving of a vehicle according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or functions has been omitted where it is determined that it would interfere with the understanding of the embodiments of the present disclosure.

In describing the components of the embodiments according to the present disclosure, terms such as first, second, A, B, (a), (b), and the like may be used. These terms are merely intended to distinguish the components from other components. The terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art. Such terms should not be interpreted in an idealized or overly formal sense unless expressly so defined herein.

FIG. 1 is a block diagram illustrating the configuration of an apparatus for controlling driving of a vehicle according to an embodiment of the present disclosure.

As shown in FIG. 1, an apparatus 100 for controlling driving of a vehicle may include a sensor 110, a camera 120, storage 130, and a controller 140.

The sensor 110 may detect an input amount of an accelerator pedal (i.e., an amount of pressure applied to the pedal or an amount the pedal is depressed) applied by a user. According to an embodiment of the present disclosure, the sensor 110 may include an accelerator pedal sensor. In addition, the sensor 110 may obtain surrounding information of the vehicle. According to an embodiment, the sensor 110 may include an ultrasonic sensor, a radar, a lidar, and the like and may include multiple sensors.

The camera 120 may obtain surrounding information of the vehicle. According to an embodiment, the camera 120 may obtain the surrounding information by photographing a front image and a surrounding image of the vehicle. The camera 120 may include a front camera and a side and/or a rear camera.

The storage 130 may store at least one algorithm for performing a calculation or execution of various commands for the operation of the apparatus for controlling driving of a vehicle according to an embodiment of the present disclosure. The storage 130 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 140 may be implemented with various processing devices such as a microprocessor in which a semiconductor chip capable of performing calculation or execution of various commands is embedded, and the like. The controller 140 may control the operation of the apparatus for controlling driving of a vehicle according to an embodiment of the present disclosure. In detail, it is possible to determine an erroneous input of the accelerator pedal based on the input amount of the accelerator pedal input by the user and to determine whether to release the autonomous driving based on whether the accelerator pedal is erroneously input. The details are described below with reference to FIG. 2.

Figure 2:
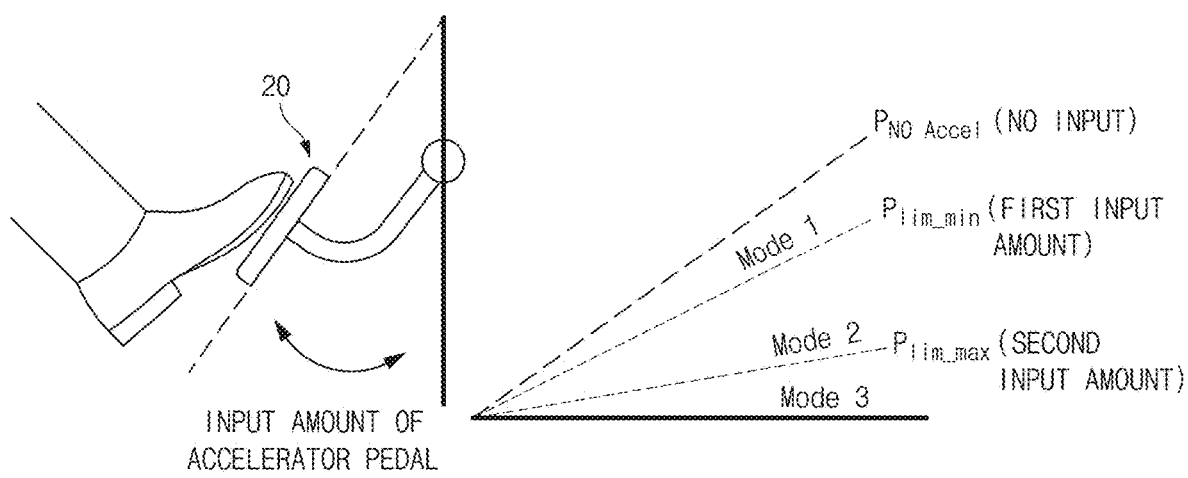
FIG. 2 is a diagram schematically illustrating a control mode according to an amount of pressure applied to an accelerator pedal by a user according to an embodiment of the present disclosure.

FIG. 2 is a diagram schematically illustrating a control mode according to an amount of pressure applied to an accelerator pedal by a user or an amount that the pedal is depressed according to an embodiment of the present disclosure.

As shown in FIG. 2, the controller 140 may set a control mode based on the degree (input amount) at which the user actuates or presses an accelerator pedal 20. According to an embodiment, the controller 140 may perform control in the first mode when the input amount of the accelerator pedal 20 does not exceed a first input amount. In this case, the first input amount may mean 5% ($P_{lim\_min}$) of the total input amount of the accelerator pedal, and the first mode may include a mode in which an autonomous driving mode is controlled to be maintained.

When the input amount of the accelerator pedal 20 exceeds the first input amount and is less than a second input amount, the controller 140 may perform control in the second mode. In this case, the second mode may include a mode in which the autonomous driving mode is controlled to be partially activated and a mode in which the autonomous driving mode is controlled to be released and the driving control right is transferred to the user, i.e., driving control is transferred to the user.

In detail, when the input amount exceeds the first input amount, the controller 140 may perform control in a mode in which the autonomous driving mode is partially activated. According to an embodiment, the controller 140 may control to maintain longitudinal autonomous driving (e.g., in the longitudinal direction or forward direction of the vehicle) of the vehicle and may perform control to release lateral autonomous driving (e.g., in the lateral direction or sideways direction of the vehicle) of the vehicle.

The controller 140 may add a time (e.g., 10 ms) during which a control logic of the present disclosure operates for one cycle to an input amount monitoring time (T wait) for monitoring the input amount of the accelerator pedal actuated by the user. The controller 140 may do so to calculate a user monitoring time (T wait'), to partially activate the autonomous driving mode during the user monitoring time (T wait'), and to determine whether the input amount of the accelerator pedal is equal to or greater than the second input amount. In this case, the second input amount may mean 90% ($P_{lim\_max}$) of the total input amount of the accelerator pedal.

When the input amount of the accelerator pedal 20 is not equal to or greater than the second input amount (i.e., the input amount of the accelerator pedal 20 is less than the second input amount), the controller 140 may determine whether the user monitoring time (T wait') is equal to or greater than the first time (e.g., 0.5 S). In other words, when the input amount of the accelerator pedal 20 is not equal to or greater than the second input amount even when the user monitoring time is longer than or exceeds the first time, the controller 140 may determine that the input amount of the accelerator pedal 20 is the input amount intended by the user and may control to release the autonomous driving so that the driving control right is transferred to the user.

In this case, the first time may mean the maximum time of user monitoring, and the controller 140 may vary the first time based on the user's driving tendency and based on the surrounding information of the vehicle. For example, when it is determined that the user has a tendency to quickly step on the accelerator pedal several times, the controller 140 may change the maximum user monitoring time from 0.5 S to 5 S. In addition, when it is determined that there is a possibility that a collision may occur when the accelerator pedal is incorrectly actuated because other vehicles or obstacles are detected around the vehicle based on the surrounding information of the vehicle, the controller 140 may change the maximum user monitoring time from 0.5 S to 2 S.

The controller 140 may perform control in a third mode when the input amount of the accelerator pedal 20 is equal to or greater than the second input amount. When the input amount of the accelerator pedal 20 is equal to or greater than the second input amount, the controller 140 may determine that the accelerator pedal is incorrectly actuated. In this case, the third mode may include a mode in which the autonomous driving is partially activated. According to an embodiment, the third mode may include a mode in which the longitudinal autonomous driving (in the longitudinal direction) of the vehicle is controlled to be maintained and the lateral autonomous driving (in the lateral direction) of the vehicle is controlled to be released.

The controller 140 may add a time (e.g., 10 ms) during which a control logic of the present disclosure operates for one cycle to an input amount monitoring time (T wait) for monitoring the input amount of the accelerator pedal by the user. The controller 140 may do so to calculate a user monitoring time (T wait'), to partially activate the autonomous driving mode during the user monitoring time (T wait'), and to determine there is no accelerator pedal input amount and the user monitoring time (T wait') is equal to or greater than the first time (the maximum user monitoring time). In other words, the controller 140 may determine whether there is no accelerator pedal input amount when the user monitoring time is equal to or longer than the first time.

When the controller 140 determines that there is no accelerator pedal input amount when the user monitoring time is equal to or longer than the first time, the controller 140 may determine that the user's erroneous accelerator pedal actuation has ended and may control to release the autonomous driving so that the driving control right is transferred to the user.

When it is determined that there is an accelerator pedal input amount when the user monitoring time is equal to or exceeds the first time, the controller 140 may determine that the user's accelerator pedal erroneous input situation has not ended and may perform control to partially activate the autonomous driving.

Figure 3:
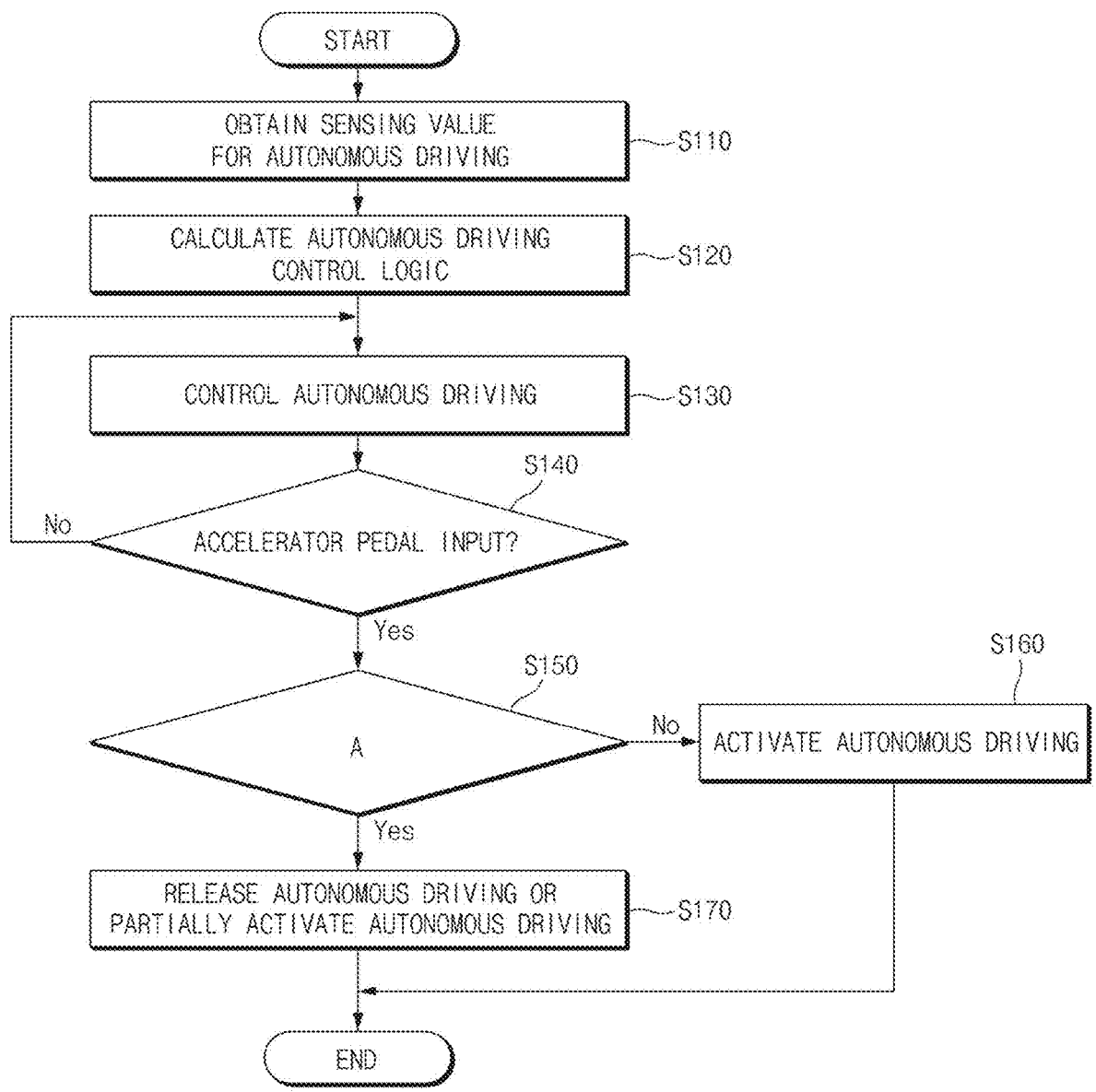
FIGS. 3 and 4 are flowcharts illustrating a method of controlling driving of a vehicle according to an embodiment of the present disclosure.
Figure 4:
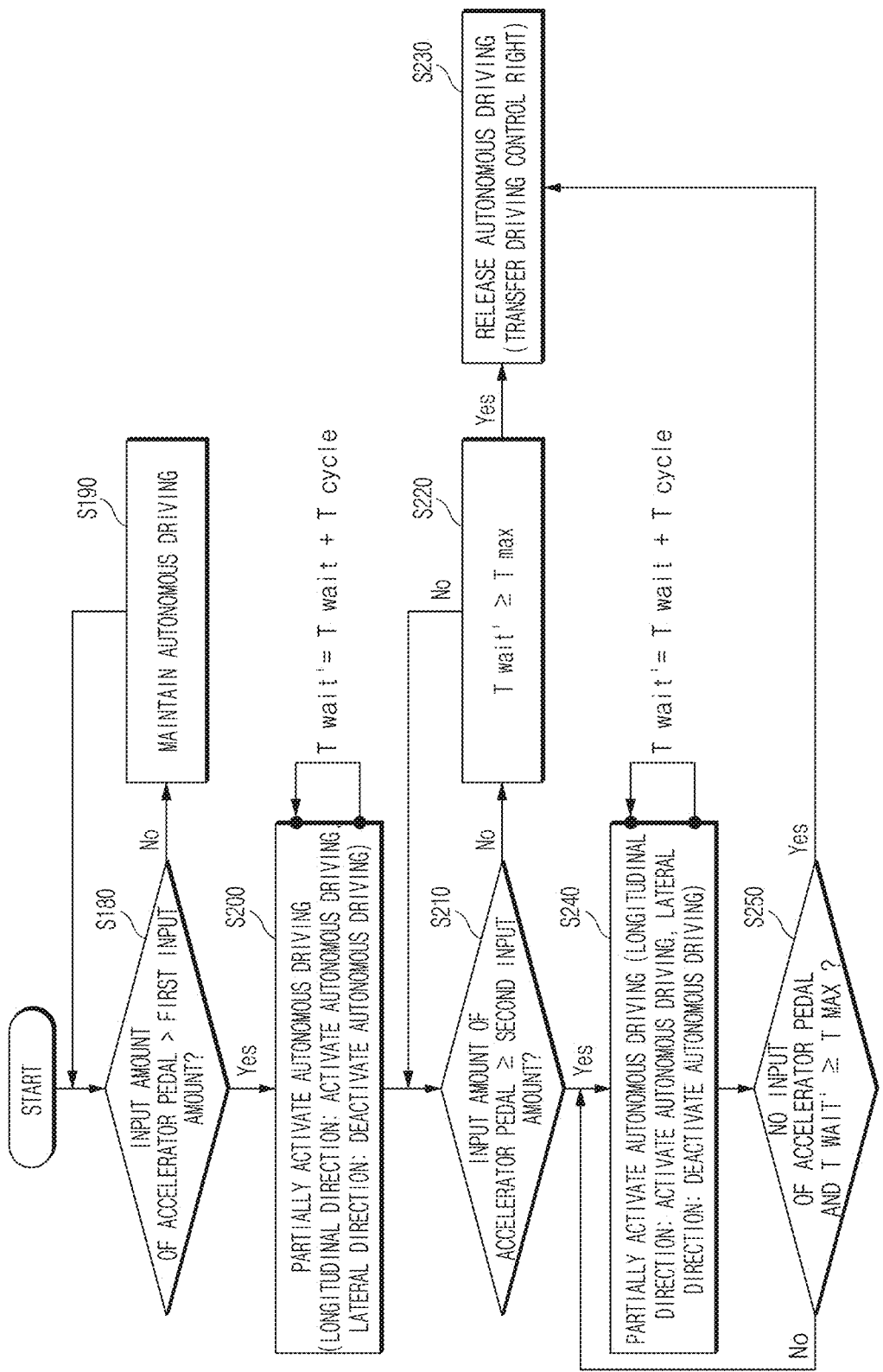

FIGS. 3 and 4 are flowcharts illustrating a method of controlling driving of a vehicle according to an embodiment of the present disclosure.

As shown in FIG. 3, the controller 140 may obtain a sensed value for autonomous driving in S110 and may calculate control logic for autonomous driving based on the sensed value for autonomous driving in S120. In S130, the controller 140 may control autonomous driving based on the control logic for autonomous driving.

In S140, the controller 140 may determine whether the user inputs the accelerator pedal. When it is determined in S140 that the accelerator pedal is not input (N), the controller 140 may control the autonomous driving in S130.

When it is determined in S140 that the accelerator pedal is input, the controller 140 may perform W in S150. According to an embodiment, the controller 140 may determine the input amount of the accelerator pedal in S150. The controller 140 may determine to maintain the autonomous driving based on the input amount of the accelerator pedal in S160 or may determine to release or partially activate the autonomous driving in S170.

The detailed description of S150 is provided below with reference to FIG. 4.

As shown in FIG. 4, in S180, the controller 140 may determine whether the input amount of the accelerator pedal by the user exceeds the first input amount. In this case, the first input amount may mean 5% ($P_{lim\_min}$) of the total input amount of the accelerator pedal.

When it is determined in S180 that the input amount of the accelerator pedal by the user does not exceed the first input amount (N), the controller 140 may control to maintain the autonomous driving in S190.

When the input amount of the accelerator pedal actuated by the user exceeds the first input amount in S180 (Y), the controller 140 may control the autonomous driving to be partially activated in S200. According to an embodiment, the controller 140 may perform control to maintain the longitudinal autonomous driving (in the longitudinal direction) of the vehicle and may release the lateral autonomous driving (in the lateral direction) of the vehicle.

In S210, the controller 140 may add a time (e.g., 10 ms) during which a control logic of the present disclosure operates for one cycle to an input amount monitoring time (T wait) for monitoring the input amount of the accelerator pedal actuated by the user. The controller 140 may do so to calculate a user monitoring time (T wait'), to partially activate the autonomous driving mode during the user monitoring time (T wait'), and to determine whether the input amount of the accelerator pedal is equal to or greater than the second input amount. In this case, the second input amount may mean 90% ($P_{lim\_max}$) of the total input amount of the accelerator pedal.

When the input amount of the accelerator pedal 20 is not equal to or greater than the second input amount in S210 (N), in S220, the controller 140 may determine whether the user monitoring time (T wait') is equal to or greater than, i.e., exceeds the first time (e.g., 0.5 S). When the input amount of the accelerator pedal 20 is not equal to or greater than the second input amount even when the user monitoring time is longer than, i.e., exceeds the first time in S220, in S230, the controller 140 may determine that the input amount of the accelerator pedal 20 is the input amount intended by the user and may perform control to release the autonomous driving so that the driving control right is transferred to the user.

In this case, the first time may mean the maximum time of user monitoring. The controller 140 may vary the first time based on the user's driving tendency and based on the surrounding information of the vehicle. For example, when it is determined that the user has a tendency to quickly step on the accelerator pedal several times, the controller 140 may change the maximum user monitoring time from 0.5 S to 5 S. In addition, when it is determined that there is a possibility that a collision may occur when the accelerator pedal is incorrectly input because other vehicles or obstacles are detected around the vehicle based on the surrounding information of the vehicle, the controller 140 may change the maximum user monitoring time from 0.5 S to 2 S.

When the user monitoring time is less than the first time in S220, the controller 140 may determine that the time for understanding the user's intention has not elapsed and may perform S210.

When the input amount of the accelerator pedal 20 is greater than or equal to the second input amount in S210 (Y), the controller 140 may determine that the accelerator pedal is erroneously actuated. When it is determined that the accelerator pedal is erroneously actuated, in S240, the controller 140 may include a mode in which the autonomous driving is controlled to be partially activated. According to an embodiment, in S240, the controller 140 may include a mode in which the longitudinal autonomous driving (in the longitudinal direction) of the vehicle is controlled to be maintained and the lateral autonomous driving (in the lateral direction) of the vehicle is controlled to be released.

In S250, the controller 140 may add a time (e.g., 10 ms) during which a control logic of the present disclosure operates for one cycle to an input amount monitoring time (T wait) for monitoring the input amount of the accelerator pedal actuated by the user. The controller 140 may do so to calculate a user monitoring time (T wait'), to partially activate the autonomous driving mode during the user monitoring time (T wait'), and to determine whether there is no accelerator pedal input amount. Also, the user monitoring time (T wait') is equal to or greater than the first time (the maximum user monitoring time). In other words, in S250, the controller 140 may determine whether there is no accelerator pedal input amount when the user monitoring time is equal to or exceeds the first time.

When the controller 140 determines in S250 that there is no accelerator pedal input amount when the user monitoring time is equal to or longer than the first time (Y), in S230, the controller 140 may determine that the erroneous accelerator pedal actuation situation has ended and may perform control to release the autonomous driving and transfer the driving control right to the user.

When it is determined that there is an accelerator pedal input amount when the user monitoring time is equal to or exceeds the first time, in S240, the controller 140 may determine that the erroneous accelerator pedal actuation situation has not ended and may perform control to partially activate the autonomous driving.

Figure 5:
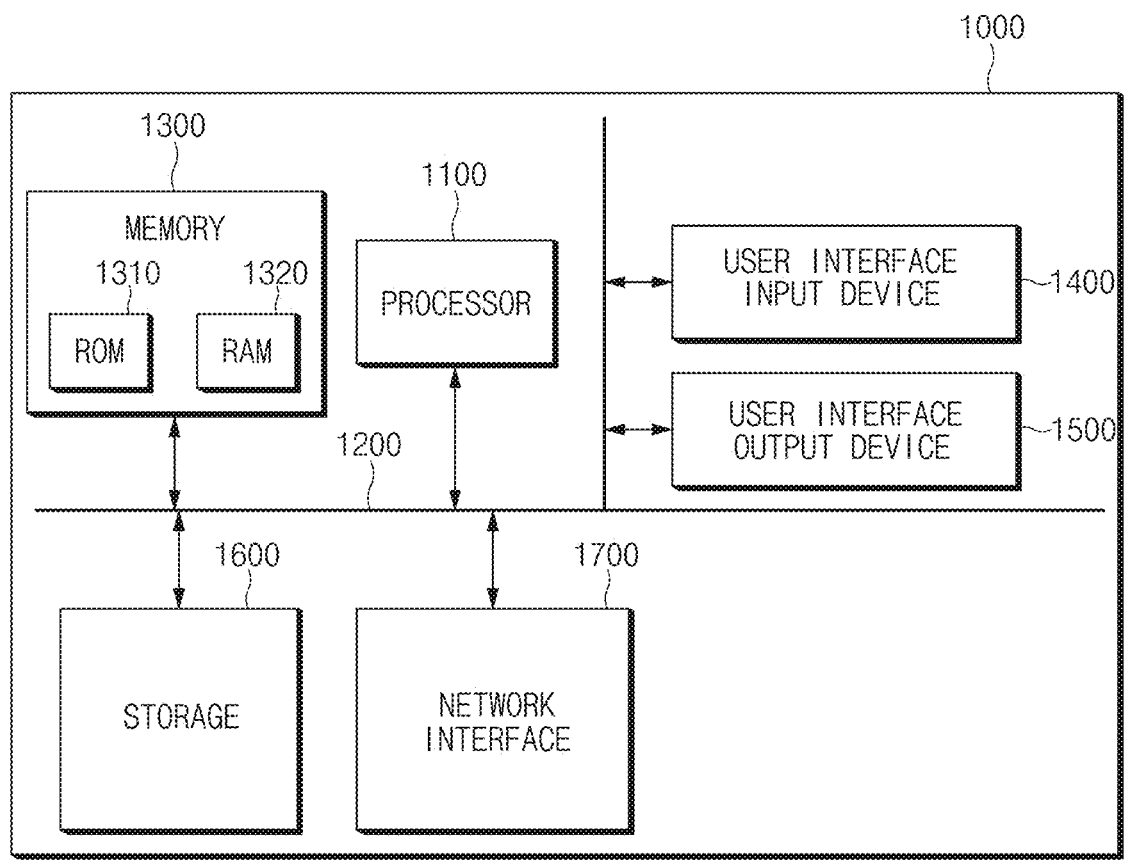
FIG. 5 is a block diagram illustrating a computing system for executing a method according to an embodiment of the present disclosure.

FIG. 5 is a block diagram illustrating a computing system for executing a method according to an embodiment of the present disclosure.

Referring to FIG. 5, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM. The storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, in a technology field that controls autonomous driving by remotely generating autonomous driving control values, the apparatus and method for controlling driving of a vehicle may determine an erroneous input of the accelerator pedal to determine whether to release the autonomous driving, thereby improving the functional safety of an autonomous vehicle, such as a robotaxi.

Although embodiments of the present disclosure have been described for illustrative purposes, those having ordinary in the art should appreciate that various modifications, additions, and substitutions are possible, without departing from the scope and spirit of the disclosure.

Therefore, the embodiments disclosed in the present disclosure are provided for the sake of description, not limiting the technical concepts of the present disclosure. It should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling driving of a vehicle, the apparatus comprising:
a sensor configured to detect an input amount of an accelerator pedal actuated by a user; and
a controller configured to determine an erroneous actuation of the accelerator pedal based on the input amount of the accelerator pedal and to determine whether to release autonomous driving according to whether the accelerator pedal is erroneously actuated,
wherein the release of autonomous driving includes that driving control is transferred to the user, and
wherein the controller is configured to determine whether the input amount of the accelerator pedal is greater than or equal to a second input amount greater than a first input amount when it is determined that the input amount of the accelerator pedal exceeds the first input amount.

2. The apparatus of claim 1, wherein the controller is configured to release lateral autonomous driving of the vehicle and maintain longitudinal autonomous driving of the vehicle when the controller determines that the input amount of the accelerator pedal exceeds the first input amount.

3. The apparatus of claim 1, wherein the controller is configured to maintain the autonomous driving when it is determined that the input amount of the accelerator pedal does not exceed the first input amount.

4. The apparatus of claim 1, wherein the controller is configured to determine whether a user monitoring time exceeds a first time when it is determined that the input amount of the accelerator pedal is not equal to or greater than the second input amount.

5. The apparatus of claim 4, wherein the controller is configured to deactivate the autonomous driving and transfer driving control to the user when it is determined that the input amount of the accelerator pedal is not equal to or greater than the second input amount at a time point when the user monitoring time exceeds the first time.

6. The apparatus of claim 1, wherein the controller is configured to determine that the accelerator pedal is erroneously actuated, to release the lateral autonomous driving of the vehicle, and to maintain the longitudinal autonomous driving of the vehicle when it is determined that the input amount of the accelerator pedal is equal to or greater than the second input amount.

7. The apparatus of claim 6, wherein the controller is configured to determine whether the input amount of the accelerator pedal exists at a time point when a user monitoring time exceeds a first time when it is determined that the input amount of the accelerator pedal is equal to or greater than the second input amount.

8. The apparatus of claim 7, wherein the controller is configured to determine that the erroneous actuation of the accelerator pedal is maintained, to release the lateral autonomous driving of the vehicle, and to maintain the longitudinal autonomous driving of the vehicle when it is determined that the input amount of the accelerator pedal exists at the time point when the user monitoring time exceeds the first time.

9. The apparatus of claim 8, wherein the controller is configured to vary the first time based on driving tendency of the user and based on surrounding information of the vehicle.

10. A method of controlling driving of a vehicle, the method comprising:
detecting an input amount of an accelerator pedal actuated by a user;
determining an erroneous actuation of the accelerator pedal based on the input amount of the accelerator pedal and determining whether to release autonomous driving according to whether the accelerator pedal is erroneously actuated; and
determining whether the input amount of the accelerator pedal is greater than or equal to a second input amount greater than a first input amount when it is determined that the input amount of the accelerator pedal exceeds the first input amount,
wherein the release of autonomous driving includes that driving control is transferred to the user.

11. The method of claim 10, further comprising:
releasing lateral autonomous driving of the vehicle and maintaining longitudinal autonomous driving of the vehicle when it is determined that the input amount of the accelerator pedal exceeds the first input amount.

12. The method of claim 10, further comprising:
determining to maintain the autonomous driving when it is determined that the input amount of the accelerator pedal does not exceed the first input amount.

13. The method of claim 10, further comprising:
determining whether a user monitoring time exceeds a first time when it is determined that the input amount of the accelerator pedal is not equal to or greater than the second input amount.

14. The method of claim 13, further comprising:
deactivating the autonomous driving and transferring driving control to the user when it is determined that the input amount of the accelerator pedal is not equal to or greater than the second input amount at a time point when the user monitoring time exceeds the first time.

15. The method of claim 10, further comprising:
determining that the accelerator pedal is erroneously actuated, releasing the lateral autonomous driving of the vehicle, and maintaining the longitudinal autonomous driving of the vehicle when it is determined that the input amount of the accelerator pedal is equal to or greater than the second input amount.

16. The method of claim 15, further comprising:
determining whether the input amount of the accelerator pedal exists at a time point when a user monitoring time exceeds a first time when it is determined that the input amount of the accelerator pedal is equal to or greater than the second input amount.

17. The method of claim 16, further comprising:
releasing the lateral autonomous driving of the vehicle and maintaining the longitudinal autonomous driving of the vehicle when it is determined that the input amount of the accelerator pedal exists at the time point when the user monitoring time exceeds the first time.

18. The method of claim 17, wherein the first time varies based on driving tendency of the user and surrounding information of the vehicle.

* * * * *